United States Patent [19]

Kolb et al.

[11] 4,310,069

[45] Jan. 12, 1982

[54] METHOD OF REDUCING NOISE DURING THROTTLING OF VAPOR AND GAS STREAMS

[75] Inventors: Fritz Kolb, Odenthal; Otto Ziegert; Silvan Fehlisch, both of Dormagen, all of Fed. Rep. of Germany

[73] Assignee: Bayer Aktiengesellschaft, Leverkusen, Fed. Rep. of Germany

[21] Appl. No.: 137,922

[22] Filed: Apr. 7, 1980

Related U.S. Application Data

[63] Continuation of Ser. No. 917,693, Jun. 21, 1978, abandoned.

[30] Foreign Application Priority Data

Jun. 25, 1977 [DE] Fed. Rep. of Germany ....... 2728778

[51] Int. Cl.$^3$ .............................................. F01N 1/08
[52] U.S. Cl. .................................................. 181/296
[58] Field of Search ...................... 181/296, 212, 175

[56] References Cited

U.S. PATENT DOCUMENTS

4,262,770  4/1981  Spencer ........................ 181/296 X

OTHER PUBLICATIONS

Joachim E. Lay, "Thermodynamics, A. Macroscopic–Microscopic Treatment", Charles E. Merrill Books, Inc., 1964, pp. 653–661.

V. H. Bender et al., "Larmminderung durch neue Techniken im Armaturenbau", 1974, Fig. 9, p. 7.

Stellgerate in der Regelungstechnik, "Supercritical Expansion", 1968, p. 31.

*Primary Examiner*—Lawrence R. Franklin
*Assistant Examiner*—Benjamin R. Fuller
*Attorney, Agent, or Firm*—Sprung, Felfe, Horn, Lynch & Kramer

[57] ABSTRACT

A method of reducing noise during the throttling of vapor and gas streams by supercritical expansion, followed by dividing the streams during deceleration.

5 Claims, No Drawings

METHOD OF REDUCING NOISE DURING THROTTLING OF VAPOR AND GAS STREAMS

This is a continuation of application Ser. No. 917,693, filed June 21, 1978, and now abandoned.

This invention relates to a method of reducing noise during the throttling of vapour and gas streams, in which divided streams flow at different rates.

The expansion of gases or vapours is necessary for control purposes in processing installations. As a process step, it is frequently encountered in chemical processes in particular. Unfortunately it gives rise to undesirable noise which is not only a nuisance in the place of work, but also pollutes the environment.

It is known that a stream can be divided into component streams which are individually expanded to the required pressure in a single stage. It is possible by this technique to obtain reductions in noise level of up to 15 dB(A), but such reductions are generally not sufficient. This small reduction in noise level is attributable to the geometric dimensions. On the one hand, there is a limit to the narrowness of the bores for the component streams because, beyond that limit, operational reliability is endangered by fouling. On the other hand, overall dimensions become unwieldy in the case of large quantities. It has also been found that optimum reductions in noise level cannot be obtained by expansion in a single stage.

In addition, throttling effects can be obtained by means of stepped resistances arranged in series.

The effectiveness of noise level reduction is critically determined by the stepped pressure gradient which is predetermined by the construction of the stepped resistances. Accordingly, subsequent adaptation to certain operating conditions is virtually impossible. Manufacturing errors also have an adverse effect. Furthermore, constructions of the type in question are often highly elaborate with the result that, in addition to high investment costs, they also require extensive maintenance.

An object of the present invention is to find a method for the low-noise expansion of gases and vapours using simple operationally reliable measures involving little maintenance which can be adapted without difficulty to the necessary processing and sound conditions.

According to the invention, this object is achieved in that, a stream is supercritically expanded over a short distance in a first zone and is then divided up several times and decelerated in an immediately adjoining second zone, the flow cross-sections of the channels in the second zone being individually smaller than in the first zone, but collectively considerably greater than the total of cross-sections in the first zone.

So far as the expert is concerned, it was surprising that a reduction in noise level of 30 dB(A) can be obtained by this method. This reduction is obtained by virtue of the fact that, in the first zone that potential energy of the flow is converted into kinetic energy corresponding to the pressure ratio and by virtue of the fact that, in the second zone, the kinetic energy is converted by friction into heat. One important factor in this respect is that, in the second zone, the conversion of energy is intensified and quieted by the relatively many, but narrow flow-off cross-sections. In addition, the narrow flow-off cross-sections produce an increase in frequency of the maximum of the radiated sound spectrum. The second zone is not intended for the dissipation of potential energy. This method also provides for a favourable control characteristic.

In one particular embodiment of the method, the total flow cross-section in the second zone is enlarged by 1.5 to 15 times the product of the quotient of the pressure on entry to the final pressure and the total flow cross-section of the first zone.

By virtue of this increase in the cross-section, the free flows are run off in such a way that they are unable to combine, thereby preventing the generation of more noise.

In another embodiment of the method according to the invention, the characteristic intervals between the boundary walls of the flow cross-sections in the second zone are smaller than the average wavelength of the radiated noise spectrum. By maintaining this ratio of wavelength to characteristic interval, which is also expressed inter alia by the Strouhal index, the resulting increases in impedance produce a noise-damping effect.

In another embodiment of the method according to the invention, expansion is divided into several stages in the first zone, which has proved to be particularly advantageous in the case of extremely high pressure gradients.

What we claim is:

1. A method of reducing noise during the throttling of vapour and gas streams, comprising the steps of supercritically expanding a stream over a short distance in a first zone having a first cross-section, and then dividing up and decelerating the supercritically expanded stream in several channels in an immediate adjoining second zone, the flow cross-section of each channel in the second zone being individually smaller than that of the first zone, but collectively larger than that of the first zone.

2. A method as claimed in claim 1, in which the total flow cross-section in the second zone is enlarged by 1.5 to 15 times the product of the quotient of pressure on entry to final pressure and the total flow cross-section of the first zone.

3. A method as claimed in claim 1 or 2, in which the characteristic intervals between the boundary walls of the flow cross-sections in the second zone are smaller than the average wavelength of the radiated sound spectrum.

4. A method as claimed in claim 1 or 2, in which expansion takes place in several stages in the first zone.

5. A method as claimed in claim 3, in which expansion takes place in several stages in the first zone.

* * * * *

UNITED STATES PATENT AND TRADEMARK OFFICE
CERTIFICATE OF CORRECTION

PATENT NO. : 4,310,069
DATED : Jan. 12, 1982
INVENTOR(S) : Fritz Kolb et al

It is certified that error appears in the above—identified patent and that said Letters Patent is hereby corrected as shown below:

Title Page    Insert --and EC Erdölchemie GMBH, Cologne,
Assignee      Fed. Rep. of Germany--.

Signed and Sealed this

Twelfth Day of October 1982

[SEAL]

Attest:

GERALD J. MOSSINGHOFF

Attesting Officer    Commissioner of Patents and Trademarks